US006275816B1

(12) United States Patent
Hattori et al.

(10) Patent No.: US 6,275,816 B1
(45) Date of Patent: Aug. 14, 2001

(54) AQUEOUS INK COMPOSITION FOR BALL-POINT PEN

(75) Inventors: Katsuya Hattori; Akio Nakamura; Mikio Morishita, all of Kawagoe (JP)

(73) Assignee: Kotobuki & Co., LTD, Kyoto (JP)

( * ) Notice: Subject to any disclaimer, the term of this patent is extended or adjusted under 35 U.S.C. 154(b) by 0 days.

(21) Appl. No.: 09/383,980

(22) Filed: Aug. 26, 1999

(30) Foreign Application Priority Data

Mar. 17, 1999 (JP) .................................................. 11-071712
Aug. 5, 1999 (JP) .................................................. 11-223113

(51) Int. Cl.$^7$ .............................. C09D 11/00; C08L 5/00
(52) U.S. Cl. ...................................... 706/31.13; 106/14.11; 106/14.13; 106/14.34; 106/14.41; 106/31.25; 106/31.28; 106/31.31; 106/31.36; 106/31.37; 106/31.39; 106/31.4; 106/31.43; 106/31.44; 106/31.55; 106/31.59; 524/27; 524/28; 524/31; 524/47; 524/55; 524/56; 524/77; 524/81; 524/276

(58) Field of Search .................. 106/14.11, 14.13, 106/14.34, 14.41, 31.13, 31.25, 31.28, 31.31, 31.36, 31.37, 31.39, 31.4, 31.43, 31.44, 31.55, 31.59; 524/27, 28, 31, 47, 55, 56, 77, 81, 276

(56) References Cited

U.S. PATENT DOCUMENTS

4,545,818    10/1985    Inoue et al. .
5,683,500  * 11/1997    Kawasumi et al. ................. 106/20 R
5,993,098  * 11/1999    Osada .................................... 401/209

FOREIGN PATENT DOCUMENTS

6-256700      9/1994    (JP) .

* cited by examiner

Primary Examiner—Samuel A. Acquah
(74) Attorney, Agent, or Firm—McGinn & Gibb, PLLC

(57) ABSTRACT

A aqueous ink for a ball-point pen which is stable over time and has high pigment dispersion stability, includes a pigment, a water-soluble organic solvent, water, xanthane gum of about 0.01 to about 0.2 wt. % and a sodium alginate of about 0.2 to about 0.6 wt. % of a total amount of the ink.

28 Claims, No Drawings

AQUEOUS INK COMPOSITION FOR BALL-POINT PEN

BACKGROUND OF THE INVENTION

1. Field of the Invention

The present invention relates to an aqueous ink composition for a ball-point pen.

2. Description of the Related Art

Conventionally, an aqueous ink for a ball-point pen has been disclosed in Japanese Patent Laid-Open No. 59-74175 or Japanese Patent Laid-Open No. 59-138281.

The aqueous ink disclosed in Japanese Patent Laid-Open No. 59-74175 contains xanthane gum of between 0.20 to 0.45 wt. %, and the aqueous ink disclosed in Japanese Patent Laid-Open No. 59-138281 contains xanthane gum of between 0.20 to 0.45 wt. % and a permeable dying agent of between 0.5 to 10.0 wt. %, for providing pseudo plastico-viscosity.

However, since xanthane gum is an ionic polysaccharide, when a large amount of xanthane gum is used, it reacts with an ionic component in the ink, preservation stability is impaired, and phenomena such as ink shortage, dripping, or dripping-down occur at an ordinary (e.g., operating) temperature for a half year to one year, resulting in writing failure. To solve these problems, Japanese Patent Laid-Open No. 6-256700, provides aqueous ink for a ball-point pen containing xanthane gum of 02. wt. % or less and a non-ionic polysaccharide of 0.01 to 0.5 wt. %, thereby improving stability over time.

When xanthane gum and non-ionic polysaccharide are mixed together, ink preservation stability is improved. However, because of non-ionic properties of polysaccharide, when the non-ionic polysaccharide is added, lengthy stirring must be performed to disperse the non-ionic polysaccharide. In addition, even after the ink has been prepared, when microscopic observation is performed to confirm the dispersion state of a pigment, there have been observed blocks of any components failing to disperse. This problem leads to writing failures.

SUMMARY OF THE INVENTION

In view of the foregoing and other problems, disadvantages, and drawbacks of the conventional aqueous ink for a ball-point pen, the present invention has been devised, and it is an object of the invention to provide an aqueous ink for a ball-point pen which has high stability over time and high pigment dispersion stability.

The present inventors have conducted extensive research to solve the above problems. As a result, the inventors discovered that the above object could be achieved by mixing a small amount of xanthane gum and an ionic polysaccharide together, and the invention is based on this finding.

That is, the aqueous ink for the ball-point pen of the invention includes a pigment, a water-soluble organic solvent, and water, and is characterized by containing xanthane gum of substantially about 0.01 to about 0.2 wt. % and an ionic polysaccharide of substantially about 0.2 to about 0.6 wt. % other that xanthane gum in a total quantity of the ink.

Xanthane gum of about 0.01 to about 0.2 wt. % is used for the aqueous ink for the ball-point pen of the present invention. If xanthane gum exceeds about 0.2 wt. %, it reacts with an ionic polysaccharide, and the ink preservation stability is impaired over time. Further, if the xanthane gum exceeds about 0.45 wt. %, writing properties of the aqueous ink are impaired, which is not preferable.

Specifically, xanthane gum includes "Kelzan" (Trade Name)(supplied by Kelco Division of Merck & Co., Ltd.) and, "Echo Gum", "Kertrol" and "Monat Gum" (Trade Names) (supplied by Dainippon Pharmaceutical Co., Ltd.).

As an ionic polysaccharide, sodium alginate is preferable and it mixes well with water. Besides sodium alginate, a natural Arabic gum, casein, gelatin, carrageenan, alginic acid, semi-synthetic carboxymethyl cellulose, sodium carboxymethylstarch, synthetic sodium polyacrylate, and/or polyacrylic acid can be used. Sodium alginate specifically includes "Manucol DMF" and "Manugel GMB" (commercially available from Dainippon Pharmaceutical Co., Ltd.) or the like.

Xanthane gum and an ionic polysaccharide other than xanthane gum are combined together, thereby uniformly dispersing a pigment quickly. Pigment dispersion stability and preservation stability are improved, and further, proper viscosity is achieved, thereby improving writing performance.

If an ionic polysaccharide such as sodium alginate exceeds about 0.6 wt. %, supernatant liquid is produced, which impairs writing performance. In contrast, if an ionic polysaccharide such as sodium alginate is less than about 0.2 wt. %, pigment stability cannot be maintained, and color gradation is produced.

Further, if only sodium alginate is used, without combining xanthane gum, thixotropy properties cannot be obtained. Similarly, when only using xanthane gum of about 0.2 wt. % or less, without combining an ionic polysaccharide, pigment stability cannot be maintained, and color gradation is produced.

However, when xanthane gum of about 0.01 to about 0.2 wt. % and an ionic polysaccharide, such as sodium alginate of about 0.2 to about 0.6 wt. %, are combine together, an ink can be produced having superior stability over time, superior pigment dispersion properties, and proper viscosity. Incidentally, when the content of xanthane gum in the ink is less than about 0.01 wt. %, thixotropy properties cannot be obtained. The relationship of varying combinations of xanthane gum and an ionic polysaccharide, such as sodium alginate, on the quality and properties of the ink is shown in Table 1 below.

TABLE 1

| Combination of Components (wt %) | Ink |
|---|---|
| Large amount of xanthanegum only (more than about 0.45 wt. %) | Poor writing performance |
| Only xanthane gum (about 0.2 to 0.45 wt. %) | Poor stability over time |

TABLE 1-continued

| Combination of Components (wt %) | Ink |
|---|---|
| Small amount of xanthane gum only (less than about 0.2 wt. %) | Pigment stability cannot be maintained and color gradation isproduced |
| Xanthane gum (about 0.01 to about 0.2 wt. %) and sodium alginate of more than 0.6 wt. % | Poor writing performance and supernatant liquid produced |
| Xanthane gum (about 0.01 to about 0.2 wt. %) and sodium alginate (about 0.2 to about 0.6 wt. %) | Good stability with an elapse of time, good pigment dispersion properties and proper viscosity |
| Xanthane gum (about 0.01 to about 0.2 wt. %) and sodium alginate (less than about 0.2 wt. %) | Pigment stability cannot be maintained, and color gradation is produced |
| Xanthane gum (less than about 0.01 wt. %) and sodium alginate | Thixotropy properties cannot be obtained |
| Only sodium alginate | Thixotropy properties cannot be obtained |

As a pigment, there can be used any of inorganic and organic pigments routinely used in conventional aqueous ink compositions without being limited thereto. The inorganic pigment may include titanium oxide, carbon black, metal powder or the like, for example. Further, the organic pigment may include azo-lake insoluble azo-pigment, chelate azo-pigment, phthalocyanine pigment, perylene and perinone pigments, anthraquinone pigment, quinacridone pigment, lake pigment, nitro pigment, nitroso-pigment or the like.

Specifically, there are exemplified Phthalocyanine blue (C. I. 74160), Phthalocyanine Green (C. I. 74260), Hansa Yellow 3G (C. I. 11670), Disazoyellow GR (C. I. 21100), Permanent Red 4R (C. I. 12335), Brilliant Carmin 6B (C. I. 15850), Quinacridone Red (C. I. 46500) or similar colors.

These pigments may be employed singly, or used in any combination. The pigment content of a total amount of the ink is generally substantially within the range of about 4 to about 12 wt. %, and is preferably within the range of about 6 to about 8 wt. %. If pigment content exceeds 12 wt. %, dispersion properties are inferior, which is not preferable.

As a water-soluble organic solvent, there can be used glycerin, diglycerin, ethylene glycol, diethylene glycol, tri-diethylene glycol, propylene glycol, polyethylene glycol, polypropylene glycol, thiodiglycol, 1-3-butylene glycol, 2-pyrrolidone, n-methyl-2-pyrrolidone, dimethylformamide, dimethylimidazolidinone or the like, singly or in combination. If ethylene glycol is used as one of water-soluble organic solvent and a content of ethylene glycol is not less than about 11 wt. %, cap-off property which is a property of retaining writability for a prolonged period of time with the cap removed from the pen, can be improved.

The water content of a total amount of the ink is set to about 35 to 49 wt. %, which is less than that used in a conventional aqueous ink for a ball-point pen. In this manner, an ink which is close to an oil-based ink is produced, thus making it possible to obtain smooth writing performance. In addition, the ball of the ball-point pen tip is hardly corroded. When a metallic pigment is used, an occurrence of hydrogen can be restricted.

Further, the ink according to the present invention may contain an antiseptic agent, a pH adjuster, an anti-corrosion agent, and/or a dispersion agent as required. A surface active agent may be present in the ink to benefit smooth rotation of the ball of the ball-point pen tip.

The antiseptic agent includes at least one of phenol, isopropyl methyl phenol, penta chlorophenol sodium, benzoic acid, sodium benzoate, dehydroacetic acid, sodium dehydroacetate, sorbic acid, potassium sorbate, 2-pyridinethiol-1 oxide sodium salt, 1,2-benzoisothiazoline-3-one, 5-chlor- 2-methyl- 4-isothizoline-3-one, 2,4-thiazolybenzimidazole, p-hydroxybenzoate ester or the like.

The pH adjuster includes amine or chloride. For example, any one or more of a variety of organic amines could be used such as monoethanol amine, diethanol amine, triethanol amine or the like, sodium hydroxide, lithium hydroxide, potassium hydroxide, sodium tripolyphosphate, sodium carbonate, urea, ammonia or the like.

The anti-corrosion agent includes at least one of tolyltriazole, benzotriazole and its derivatives, fatty acid phosphorous derivatives, such as octyl phosphate, dioctyl thiophosphate, imidazole, benzoimidazole and its derivative, 2-mercaptobenzothiazole, octyl methane sulfonic acid, dicyclohexyl ammonium nitrate, diisopropyl ammonium nitrate, propargyl alcohol, dialkylthio urea or the like.

The dispersion age includes a water-soluble agent such as styrene-acrylic resin dispersing agent and styrene-maleic acid resin dispersing agent. The surface active agent includes a least one of potassium linoleic acid, potassium oleate, sodium oleate, polyoxy ethylene alkylether phosphate, polyoxy ethylene alkyl phenyl ether, polyoxy ethylene lanolin or the like.

The present disclosure relates to subject matter contained in Japanese Patent Application No. Hei 11-71712, filed Mar. 17, 1999, and Japanese Patent Application No. Hei 11-223113, filed Aug. 5, 1999, and which are expressly incorporated herein by reference in its entirety.

DESCRIPTION OF THE PREFERRED EMBODIMENTS

Hereinafter, referring to the Examples provided, there are shown preferred embodiments of the present invention.

TABLE 2

| Component | Examples (wt. %) | | | | |
|---|---|---|---|---|---|
| | Ex. 1 | Ex. 2 | Ex. 3 | Ex. 4 | Ex. 5 |
| Pigment Dispersed Solution | Black Pigment | Blue Pigment | Red Pigment | Black Pigment | Blue Pigment |
| Pigment | 6.0 | 6.0 | 6.0 | 6.0 | 6.0 |
| Glycerin | 8.5 | 8.55 | 8.5 | 8.5 | 8.5 |
| Ethylene Glycol | 4.0 | 4.0 | 4.0 | 4.0 | 4.0 |
| Water | 30.0 | 30.0 | 30.0 | 30.0 | 30.0 |
| Styrene-Acrylic Resin Dispersing Agent (or Styrene- | 1.5 | 1.5 | 1.5 | 1.5 | 1.5 |

TABLE 2-continued

| | | | | | |
|---|---|---|---|---|---|
| Maleic Acid Resin Dispersing Agent) | | | | | |
| Xanthane Gum | 0.15 | 0.15 | 0.15 | 0.15 | 0.15 |
| Sodium Alginate | 0.6 | 0.6 | 0.7 | 0.6 | 0.6 |
| Glycerin | 20.75 | 20.75 | 20.65 | 21.16 | 21.16 |
| Anticorrosion Agent (Bnzotriazole) | 0.5 | 0.5 | 0.5 | 0.09 | 0.09 |
| Antiseptic Agent (1,2-benzoisothiazoline-3-one) | 1.0 | 1.0 | 1.0 | 1.0 | 1.0 |
| pH Adjuster (Triethanolamine) | 8.0 | 8.0 | 8.0 | 8.0 | 8.0 |
| Surface Active Agent (Potassium Oleate) | 3.0 | 3.0 | 3.0 | 3.0 | 3.0 |
| Ion-Exchange Water | 16.0 | 16.0 | 16.0 | 9.0 | 9.0 |
| Ethylene Glycol | — | — | — | 7.0 | 7.0 |

| | Examples (wt. %) | | | | |
|---|---|---|---|---|---|
| | Ex. 6 | Ex. 7 | Ex. 8 | Ex. 9 | Ex. 10 |
| Pigment Dispersed Solution | Red Pigment | Green Pigment | Black Pigment | Blue Pigment | Red Pigment |
| Pigment | 6.0 | 6.0 | 6.0 | 6.0 | 6.0 |
| Glycerin | 8.5 | 8.5 | 8.5 | 8.5 | 8.5 |
| Ethylene Glycol | 4.0 | 4.0 | 4.0 | 4.0 | 4.0 |
| Water | 30.0 | 30.0 | 30.0 | 30.0 | 30.0 |
| Styrene-Acrylic Resin Dispersing Agent (or Styrene-Maleic Acid Resin Dispersing Agent) | 1.5 | 1.5 | 1.5 | 1.5 | 1.5 |
| Xanthane Gum | 0.15 | 0.15 | 0.15 | 0.15 | 0.15 |
| Sodium Alginate | 0.7 | 0.7 | 0.3 | 0.3 | 0.3 |
| Glycerin | 21.06 | 20.0 | 21.16 | 21.16 | 21.06 |
| Anticorrosion Agent (Bnzotriazole) | 0.09 | 0.09 | 0.09 | 0.09 | 0.09 |
| Antiseptic Agent (1,2-benzoisothiazoline-3-one) | 1.0 | 1.0 | 1.0 | 1.0 | 1.0 |
| pH Adjuster (Triethanolamine) | 8.0 | 8.0 | 8.0 | 8.0 | 8.0 |
| Surface Active Agent (Potassium Oleate) | 3.0 | 3.0 | 3.0 | 3.0 | 3.0 |
| Ion-Exchange Water | 9.0 | 8.06 | 9.0 | 9.0 | 9.0 |
| Ethylene Glycol | 7.0 | 9.0 | 7.3 | 7.3 | 7.4 |

| | Examples (wt. %) | Comparative Examples (wt. %) | | |
|---|---|---|---|---|
| | Ex. 11 | 1 | 2 | 3 |
| Pigment Dispersed Solution | Green Pigment | Black Pigment | Blue Pigment | Red Pigment |
| Pigment | 6.0 | 6.0 | 6.0 | 6.0 |
| Glycerin | 8.5 | 8.5 | 8.5 | 8.5 |
| Ethylene Glycol | 4.0 | 4.0 | 4.0 | 4.0 |
| Water | 30.0 | 30.0 | 30.0 | 30.0 |
| Styrene-Acrylic Resin Dispersing Agent (or Styrene-Maleid Acid Resin Dispersing Agent | 1.5 | 1.5 | 1.5 | 1.5 |
| Xanthane Gum | 0.15 | 0.15 | 0.15 | 0.15 |
| Sodium Alginate | 0.3 | — | — | — |
| Glycerin | 20.0 | 21.35 | 21.35 | 21.35 |
| Anticorrosion Agent (Bnzotriazole) | 0.09 | 0.5 | 0.5 | 0.5 |
| Antiseptic Agent (1,2-benzoisothiazoline-3-one) | 1.0 | 1.0 | 1.0 | 1.0 |
| pH Adjuster (Triethanolamine) | 8.0 | 8.0 | 8.0 | 8.0 |
| Surface Active Agent (Potassium Oleate) | 3.0 | 3.0 | 3.0 | 3.0 |
| Ion-Exchange Water | 8.06 | 16.0 | 16.0 | 16.0 |
| Ethylene Glycol | 9.4 | — | — | — |

In any of the Examples 1–3, a glycerin, a benzotriazole, an antiseptic agent (1,2-benzoisothiazoline-3-one), pH adjuster (triethanol amine), and a surface active agent (potassium oleate) were poured into a beaker, and were stirred for 5 minutes at 1000 rpm. Ion exchange water, xanthane gum, and sodium alginate were added, and were stirred for 2 hours at 1000 rpm. Then, pigment dispersed solution was added to this solution, and was stirred for 1 hour at 1000 rpm. Similarly, in any of the Examples 4–11, glycerin, benzotriazole, an antiseptic agent (1,2-benzoisothiazoline-3-one), pH adjuster (triethanol amine), a surface active agent (potassium oleate) and ethylene glycol were poured into a beaker, and were stirred for 5 minutes at 1000 rpm. Ion exchange water, xanthane gum, and sodium alginate were added, and were stirred for 2 hours at 1000 rpm. Then, pigment dispersed solution was added to this solution, and was stirred for 1 hour at 1000 rpm. Each of Comparative Examples 1–3 was prepared in the same manner as each of the Examples 1–3 was done, except that sodium alginate was not added.

According to Examples 1 through 11, a good ink was obtained, and no change occurred while the ink was preserved (for 16 weeks) in a thermostat vessel (e.g., at about 50° C. (122° F.)). In each of the Comparative Examples, pigment stability was not maintained, and color gradation was produced.

In addition, Examples 4 to 11 show good cap-off property because they contain comparatively more ethylene glycol (not less than 11 wt. %) and less water than the other Examples and the Comparative Examples. Examples 1–11 were filled with an ink tank of ball-point pens and were tested to determine how long the pens can last with the camp removed from the pen. Examples 1 to 3 indicated that the average length of time the pens lasted was 14 days, while Examples 4 to 11 indicated that the average length of time the pens lasted was 21 days. Good cap-off property can be obtained in Examples 4 to 11.

Generally, when the amount of water-soluble solvent, except water, is increased, ink on a paper dries more slowly and tends to transfer easily to a stacked sheet. However, when a portion of water is replaced with ethylene glycol, the ink permeates paper rapidly and tends to be prevented from transferring to other sheets. When water is decreased and ethylene glycol is increased, this transferring problem can be eliminated and the cap-off property can be improved as described above.

As described above, according to the present invention, an aqueous ink for a ball-point pen is provided having improved viscosity and high stability over time by mixing a small amount of xanthane gum and ionic polysaccharide. Further, a pigment can be dispersed finely and uniformly within a short time period, and the aqueous ink for the ball-point pen with high pigment dispersion stability can be provided.

While the invention has been described in terms of several preferred embodiment, those skilled in the art will recognize that the invention can be practiced with modification within the spirit and scope of the appended claims.

Having thus described our invention, what we claim as new and desire to secure by Letters Patent is as follows:

1. An aqueous ink for a ball-point pen, comprising:
   a pigment;
   a water-soluble organic solvent; and
   water;
   wherein said aqueous ink comprises xanthane gum of substantially about 0.01 to about 0.2 wt. % and an ionic polysaccharide of substantially about 0.2 to about 0.6 wt. %, other than xanthane gum, in a total amount of the ink.

2. The aqueous ink as claimed in claim 1, wherein said ionic polysaccharide, other than xanthane gum, comprises a sodium alginate.

3. The aqueous ink as claimed in claim 1, wherein a water content is substantially about 35 to about 49 wt. % in the total amount of the ink.

4. The aqueous ink as claimed in claim 2, wherein a water content is substantially about 35 to about 49 wt. % in the total amount of the ink.

5. The aqueous ink as claimed in claim 1, wherein said ionic polysaccharide, other than xanthane gum, is at least one substance selected from the group consisting of a natural Arabic gum, casein, gelatin carrageenan, alginic acid, semi-synthetic carboxymethyl cellulose, sodium caboxymethylstarch, synthetic sodium polyacrylate, and polyacrylic acid.

6. The aqueous ink as claimed in claim 3, wherein said ionic polysaccharide, other than xanthane gum, is at least one substance selected from the group consisting of a natural Arabic gum, casein, gelatin, carrageenan, alginic acid, semi-synthetic carboxymethyl cellulose, sodium carboxymethylstarch, synthetic sodium polyacrylate, and polyacrylic acid.

7. The aqueous ink as claimed in claim 1, wherein said pigment comprises an inorganic pigment.

8. The aqueous ink as claimed in claim 2, wherein said pigment comprises an inorganic pigment.

9. The aqueous ink as claimed in claim 1, wherein said pigment comprises an organic pigment.

10. The aqueous ink as claimed in claim 2, wherein said pigment comprises an organic pigment.

11. The aqueous ink as claimed in claim 7, wherein said inorganic pigment is at least one substance selected from the group consisting of titanium oxide, carbon black, and metal powder.

12. The aqueous ink as claimed in claim 8, wherein said inorganic pigment is at least one substance selected from the group consisting of titanium oxide, carbon black, and metal powder.

13. The aqueous ink as claimed in claim 9, wherein said organic pigment is at least one substance selected from the group consisting of azo-lake, insoluble azo-pigment, chelate azo-pigment, phthalocyanine pigment, perylene and perinone pigments, anthraquinone pigment, quinacridone pigment, lake pigment, nitro pigment, and nitroso-pigment.

14. The aqueous ink as claimed in claim 10, wherein said organic pigment is at least one substance selected from the group consisting of azo-lake, insoluble azo-pigment, chelate azo-pigment, phthalocyanine pigment, perylene and perinone pigments, anthraquinone pigment, quinacridone pigment, dye-rake, nitro pigment, and nitroso-pigment.

15. The aqueous ink as claimed in claim 1, wherein a content of said pigment is substantially within the range of about 4 to about 12 wt. %.

16. The aqueous ink as claimed in claim 15, wherein a content of said pigment is substantially within the range of about 6 to about 8 wt. %.

17. The aqueous ink as claimed in claim 2, wherein a content of said pigment content is substantially within the range of about 4 to about 12 wt. %.

18. The aqueous ink as claimed in claim 17, wherein a content of said pigment is substantially within the range of about 6 to about 8 wt. %.

19. The aqueous ink as claimed in claim 1, wherein said water-soluble organic solvent comprises at least one substance selected from a group consisting of glycerin, diglycerin, ethylene glycol, diethylene glycol, tridiethylene glycol, propylene glycol, polythene glycol, polypropylene glycol, thiodiglycol, 1-3-butylene glycol, 2-pyrrolidone, n-methyl-2-pyrrolidone, dimethylformamide, and dimethylimidazolidinone.

20. The aqueous ink as claimed in claim 2, wherein said water-soluble organic solvent is at least one substance select from the group consisting of glycerin, diglycerin, ethylene glycol, diethylene, glycol, tridiethylene glycol, propylene glycol, polyethylene glycol, polypropylene glycol, thiodiglycol, 1-3-butylene glycol, 2-pyrrolidone, n-methyl-2-pyrrolidone, dimethylformamide, and dimethylimidazolidinone.

21. The aqueous ink as claimed in claim 1, further including at least one of a surface active agent, an antiseptic agent, a pH adjuster, an anticorrosion agent, and a dispersion agent.

22. The aqueous ink as claimed in claim 2, further including at least one of a surface active agent, an antiseptic agent, a pH adjuster, an anticorrosion agent, and a dispersion agent.

23. The aqueous ink according to claim 21, wherein said pH adjuster includes at least one of monoethanol amine, diethanol amine, triethanol amine, sodium hydroxide, lithium hydroxide, potassium hydroxide, sodium tripolyphosphate, sodium carbonate, urea, and ammonia.

24. The aqueous ink according to claim 21, wherein said anti-corrosion agent includes at least one of tolytriazole, benzotriazole and its derivatives, fatty acid phosphorous derivatives including any of octyl phosphate, dioctyl thiophosphate, imidazole, benzomidazole and its derivative, 2-mercaptobenzothiazole, octyl methane sulfonic acid, dicyclohexyl ammonium nitrate, diisopropyl ammonium nitrate, propargyl alcohol, and dialkylthio urea.

25. The aqueous ink according to claim 21, wherein said antiseptic agent includes at least one phenol, isopropyl methyl phenol, penta chlorophenol sodium, benzoic acid, sodium benzoate, dehydroacetic acid, sodium dehydroacetate, sorbic acid, potassium sorbate, 2-pyridinethiol-1 oxide sodium salt, 1,2-benzoisothiazoline-3-one, 5-chlor-2-methyl-4-isothizoline-3-one, 2,4-thiazolylbenzimidazole, and p-hydroxybenzoate ester.

26. The aqueous ink according to claim 21, wherein said surface active agent includes at least one of potassium linoleic acid, potassium oleate, sodium oleate, polyoxy ethylene alkylether phosphate, polyoxy ethylene alkyl phenyl ether, and polyoxy ethylene lanolin.

27. The aqueous ink according to claim 1, wherein said water-soluble organic solvent comprises ethylene glycol and a content of said ethylene glycol is substantially not less than about 11 wt. %.

28. The aqueous ink according to claim 2, wherein said water-soluble organic solvent comprises ethylene glycol and a content of said ethylene glycol is substantially not less than about 11 wt. %.

* * * * *